INVENTOR
RAYMOND J. BARBETTA
BY Robert W. Berray
ATTORNEY

Oct. 17, 1967 R. J. BARBETTA 3,348,214

ADAPTIVE SEQUENTIAL LOGIC NETWORK

Filed June 28, 1965 4 Sheets-Sheet 2

United States Patent Office 3,348,214

Patented Oct. 17, 1967

3,348,214

ADAPTIVE SEQUENTIAL LOGIC NETWORK

Raymond J. Barbetta, Poughkeepsie, N.Y., assignor to International Business Machines Corporation, Armonk, N.Y., a corporation of New York Filed June 28, 1965, Ser. No. 467,315
9 Claims. (Cl. 340—172.5)

This invention relates to logic circuitry for producing a sequence of outputs from a plurality of output devices and more particularly to an output sequence producing device which may be adapted to produce any desired sequence of outputs in response to one or more input signals.

An article entitled, "Flow Table Logic," by P. R. Low and G. A. Maley in Proceedings of the I.R.E., volume 49, No. 1, page 221, discusses the desirability of mass-producing circuit devices in matrix form for solving various forms of sequential logic problems. The device disclosed is a matrix of light-producing elements and photo-conductors which can be wired in one of two ways to provide a logical sequential progression from stable states within the matrix to other stable states for producing a desired output. The procedure outlined requires the generation of a flow table specifying stable states and unstable states. The matrix of photo-conductors are then wired to provide the necessary outputs and transfer lines to cause the logical and sequential progression of stable states from photo-conductor to photo-conductor within the matrix.

The desirability of mass-producing electronic circuits for use in electronic devices is evident. The cost per unit of large quantities of any apparatus is always less than when only a few are produced. At the present time, mass production of certain electronic circuits is being accomplished. However, the mass production of a particular type of electronic circuit to be utilized with mass-produced electronic circuits of other configurations will still cost more than the mass production of a single electronic apparatus which can be utilized to perform various functions.

There are many electronic circuit devices which are interconnected to produce sequential logic operations. A few of the functions for which the present invention is adapted, but which up to the present time are all manufactured separately, include ring counters, frequency dividers, character recognition devices, and pulse generators utilized for controlling data flow in data processing systems. A ring counter must be adapted to produce one out of a plurality of outputs in a particular sequence in response to an input. A frequency divider must be adapted to produce an output only after receipt of a predetermined number of inputs. A character recognition circuit, if it is to receive coded signals in serial form, must be adapted to produce an output only upon receipt of the required sequence of serial inputs. A pulse generator in a data processing system utilized for controlling the sequence in which data is transferred from apparatus to apparatus must be adapted to produce the same command sequence in response to, for example, an instruction of a program. Once the particular pulse sequence for the desired function has been determined, the device must be pre-wired and remain fixed.

It is the primary object of this invention to provide a circuit network for accomplishing a variety of sequentially effective logic operations.

It is another important object of this invention to provide a circuit network capable of producing a variety of sequential logic operations, the desired operation of the network being electronically selectable.

It is also an object of this invention to provide a circuit network capable of being electronically controlled to perform various sequential logic functions wherein the sequential output of the particular function can also be modified.

It is another object of this invention to provide a circuit network for producing a sequence of one out of a plurality of outputs in response to a sequence of one out of a plurality of inputs, the output sequence of which can be electronically modified.

These and other objects are achieved in a preferred embodiment of the present invention which includes a plurality of output devices each of which can respond to one of a plurality of inputs to produce an output from a single one of the devices and which progresses from one output device to another output device in a sequence. The sequence in which the output devices receive input signals is controlled by a matrix of adaptive memory cells which can be selectively and electronically controlled to produce the desired sequence of input signals to the output devices. The matrix of adaptive memory cells is made to produce the desired sequence of inputs to the output devices in response to primary input signals which occur as one signal out of a plurality in a predetermined sequence. The adaptive memory cells not only receive signals from the primary inputs, but also receive signals from the present output condition of the output devices. When the entire circuit network is being adapted to perform a sequence of outputs to perform a particular logic function, the matrix of adaptive memory cells receive as an additional input, one out of a plurality of signals indicating the next desired output signal from the plurality of output devices. Therefore, during the portion of the circuit operation in which it is being adapted to perform a certain function, each adaptive memory cell receives a primary input, the present output condition of the output devices, and a signal indicating the next desired output condition. Once the adapting sequence has been performed, the adaptive memory cells will produce the desired sequence of signals to the output devices in response only to the primary inputs and the present stable state of the output devices. Also provided, is a means by which the matrix of adaptive memory cells can be reset in order that the matrix can be made to adapt to another sequential logic function.

The foregoing and other objects, features and advantages of the invention will be apparent from the following more particular description of a preferred embodiment of the invention, as illustrated in the accompanying drawings.

Figure 1:
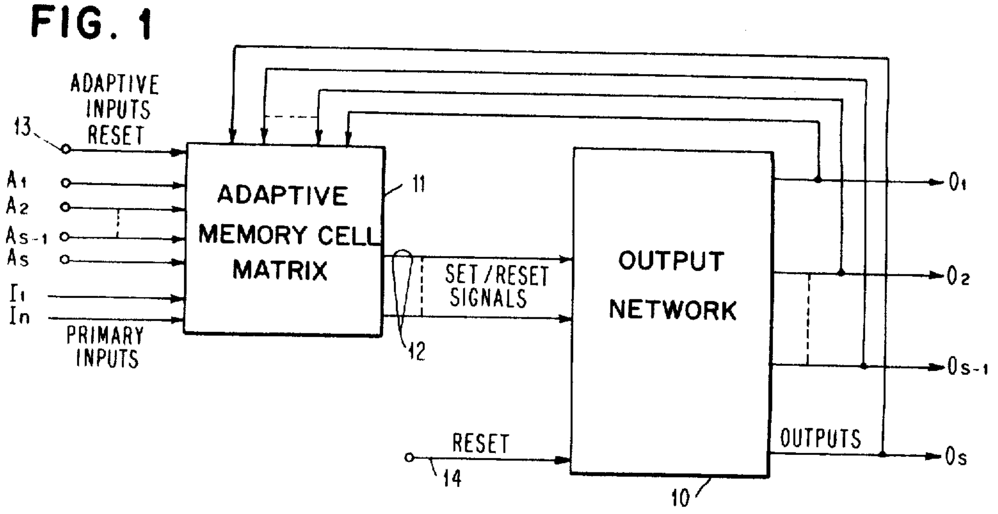
FIGURE 1 is a block diagram showing the interconnection of lines between a network of output devices and a matrix of adaptive memory cells.

FIGURE 1 depicts in block diagram form the interconnection of the basic units of the adaptive sequential logic network. The device disclosed in FIGURE 1, to be more fully described later, is a device which can be readily manufactured in a matrix form, without variation, but which will be capable of performing a plurality of functions. The output sequence of each of the functions which the mass-produced device can perform may also be varied. This device then provides a single-design logic network capable of producing a plurality of functions, each of the functions being capable of variation.

The basic units depicted in FIGURE 1 consist of the sequential output network 10 and the adaptive memory cell matrix 11. The sequential output network 10 consists of a plurality of output devices each having two stable states and having set and reset inputs. Each output device produces an output signal in response to a set input. The output signals are represented by lines labeled O1, O2, . . . O*s*–1 and O*s*.

It is the function of the entire adaptive sequential logic network to produce a sequence of output signals from the sequential output network 10 in response to a sesequence of primary input signals labeled in FIGURE 1 as I1 . . . I*n*. In other words, in response to a sequence of 1 out of *n* primary inputs, the sequential output network 10 is to produce a sequence of 1 out of *s* outputs.

The sequence in which the 1 out of *s* outputs are produced from the sequential output network 10, is controlled by a plurality of set and reset inputs 12, each connected to the set or reset input of one of the output devices in the sequential output network 10. The sequence in which the set or reset inputs 12 is produced is controlled by the adaptive memory cell matrix 11. Since it is a primary function of the invention to enable the entire network to produce any desired sequence of outputs in response to any desired sequence of inputs, a plurality of adaptive inputs (A1, A2, . . . A*s*–1, A*s*) are provided to the adaptive memory cell matrix 11. It will be the function of the adaptive inputs during a first cycle of operation of the entire circuit, to adapt the adaptive memory cell matrix 11 to produce a desired sequence of set and reset inputs 12 in response to a present stable state of the sequential output network 10, O1 through O*s*, and a particular one of the primary inputs I1 through I*n*. In other words, the set or reset signals 12 will be produced in a desired sequence in response to the present output condition of the sequential output network 10, a particular one of the primary inputs, and an adaptive input representing the next desired output signal from the sequential output network 10. After the first cycle of operation in which the adaptive inputs A1 through A*s* are applied, the adaptive memory cell matrix 11 will have been electronically controlled to thereafter produce the desired sequence of set and reset inputs 12 to the sequential output network 10 to produce a desired sequence of outputs O1 through O*s* in response only to the sequence of 1 out of *n* primary inputs I1 through I*n*.

If and when it becomes desirable to change the function of the outputs of the sequential output network 10 or to vary the sequence produced for a particular chosen function, a reset input 13 is provided to the adaptive memory cell matrix to reset the matrix to condition it to adapt to a new sequence of desired outputs and the new sequence of primary inputs. Also provided is a reset signal 14 to the sequential output network 10 which can, for any desired reason, reset the sequential output network 10 to a starting point for a particular function.

Figure 2:
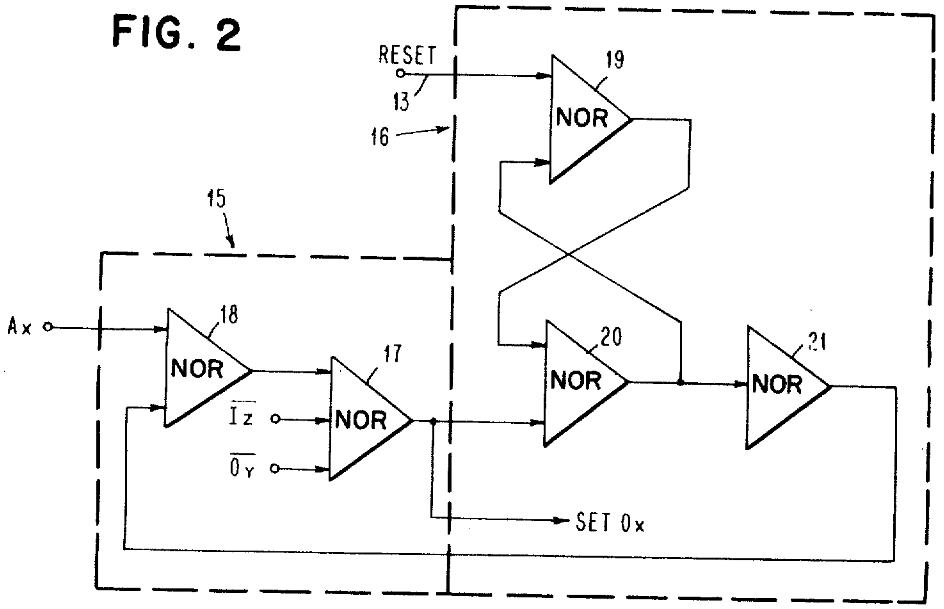
FIGURE 2 is a circuit diagram of a single adaptive memory cell utilized to form the adaptive memory cell matrix shown in FIGURE 1.

FIGURE 2 depicts a single adaptive memory cell utilized in the matrix 11 of FIGURE 1. The circuit technology for implementing the logic of each memory cell can be any desired type. The logic can include any well known AND circuits, OR circuits and Inverting circuits. The device of the present invention has been implemented entirely with a logic device known as a NOR circuit. The actual circuitry for a NOR logic block is shown and described in U.S. Patent 3,040,198 issued to G. A. Maley, June 19, 1962, assigned to the assignee of this invention. The operation of a NOR logic circuit is such that the output will be at an up level when all inputs are at a down level and will produce a down level at the output when any input is at an up level. If the NOR circuit is to perform an AND function, the significant output will be an up level produced only when all inputs are at a down level. If the circuit is to perform the OR function, the significant output of the circuit will be a down level produced whenever any input is at an up level. The adaptive memory cells in the matrix 11 of FIGURE 1 can be implemented in any type of logic, however, the NOR circuit is itself adapted to mass production such that even further savings are realized in mass-producing an adaptive sequential logic network from mass-produced components.

Each memory cell of the adaptive memory cell matrix 11 of FIGURE 1 contains essentially two parts. The first part is a gating circuit and is depicted within the area of the broken line designated at 15. The second part of the memory cell is a latch or memory device denoted within the area of the broken line designated at 16. The memory device or latch 16 will be set to produce a significant output the first time the gating circuit 15 receives the required inputs.

In FIGURE 2, NOR circuit 17 is a gating means serving to produce an AND function to produce a significant up-level output, or set signal to the sequential output network 10 of FIGURE 1, when the proper combination of down levels of the input signals is received. The input signals received by NOR 17 include a down level when a primary input I*z* is present, a down signal produced when the sequential output network 10 of FIGURE 1 is producing the output O*y* and when a down level is received from an enabling NOR circuit 18. The bar symbol over any designated signal indicates that the signal is significant when at a down or negative level as opposed to an up or positive level. The enabling NOR 18 receives as inputs an adaptive input signal A*x* and an output from the latch or bistable circuit 16.

The latch 16 is comprised of NOR circuits 19, 20, and 21. It is the function of the entire memory cell of FIGURE 2 to provide a set input to an output device to produce output O*x* whenever the combination of inputs to NOR 17 is such that the primary input I*z* is present in combination with the present state O*y* of the sequential output network. If it is assumed that the memory cell has been previously reset by an up level on line 13, corresponding to the reset signal shown in FIGURE 1, the stable configuration of the memory cell will be such that the following levels will be produced by the designated NOR circuits: NOR 19 down, NOR 20 up, NOR 21 down, NOR 18 up, and NOR 17 down. When it is desired to produce an up level from NOR 17 to set the output device O*x*, it will be necessary to produce an enabling signal from NOR 18 in the form of a down level at the input to NOR 17 in the presence of a down level produced by a primary input I*z* and a down level from the present output O*y* of the sequential output network. The manner in which NOR 18 is caused to produce a down level is to cause the adaptive input A*x* to have an up level. In other words, adaptive input A*x* will be brought to an up level when it is desired to have this particular memory cell produce a set signal to output device O*x*. When the adaptive input A*x* is made positive, NOR 18 will produce a down level to NOR 17. The presence of a down level on all three inputs to NOR 17 will cause an up-level output to the set input of the output device O*x* to produce the desired output O*x*. When NOR 17 produces an up level, the output of NOR 20 will switch to produce a down level which, when combined with the down level on the reset line 13 at NOR 19, will produce an up level which is fed back to NOR 20 to maintain the NOR 20 output at a down level. NOR 21 will receive the down level from NOR 20 to produce an up level at the input to NOR 18. After removal of the adaptive input A*x*, the up level of NOR 21 at the input to NOR 18 will maintain the enabling signal to NOR 17 at a down level. Thereafter, NOR 17 will produce a positive set signal to output device O*x* whenever the primary input I*z* is present and the present state of the output network is at O*y*. It can thus be seen, that the set signal to output device O*x* will be produced by a network which has been selectively adapted to produce this signal in response only to the primary input and the present stable state of the sequential output network.

The remainder of the detailed description will be concerned with describing the output devices found in the sequential output network 10 of FIGURE 1 and the adaptive memory cell matrix 11 shown in block form in FIGURE 1 wherein each of the memory cells within the matrix is formed of NOR logic as described in connection with FIGURE 2. A particular description will follow in which the sequential output network 10 of FIGURE 1 will produce a desired sequence of 1 out of 4 outputs in response to a sequence of primary inputs consisting of the presence of 1 out of 2 primary inputs.

Figure 3:
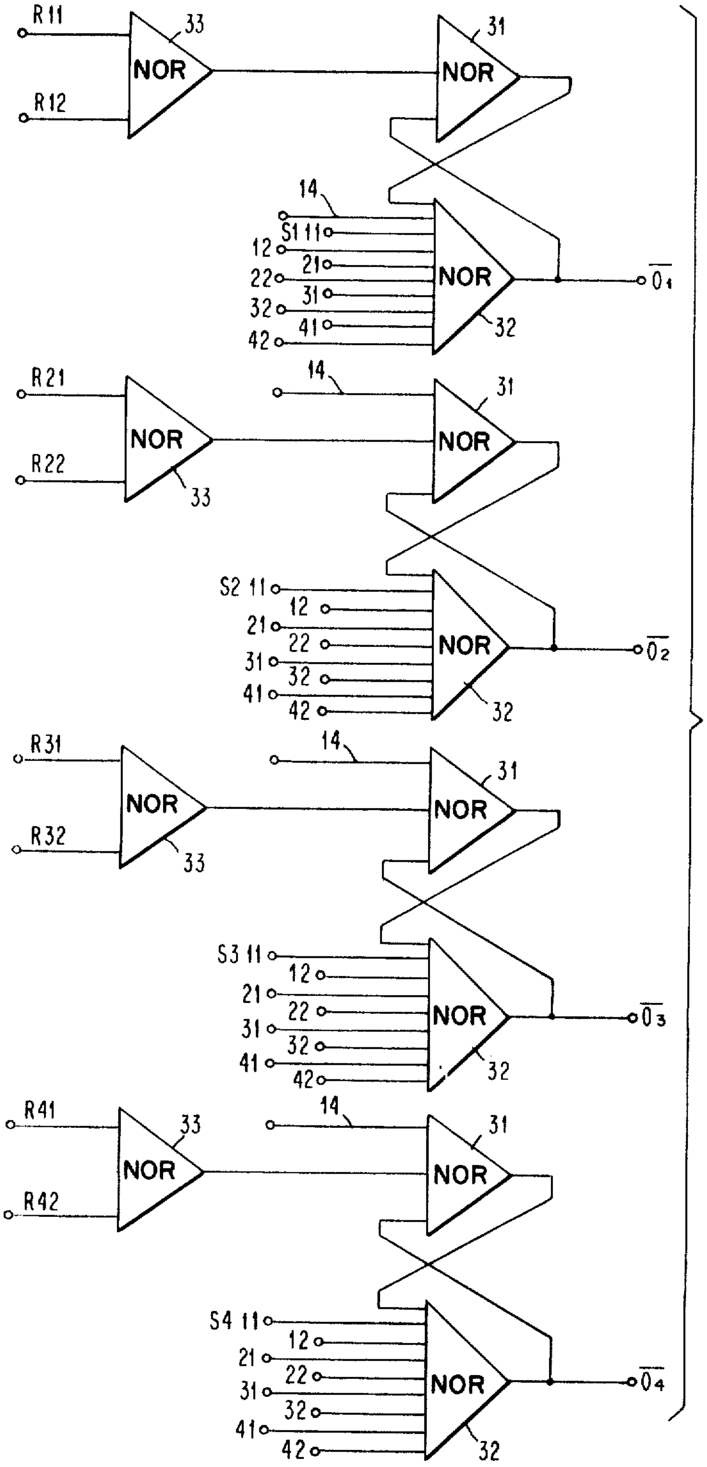
FIGURE 3 is a circuit diagram of a plurality of output devices contained in the output network shown in FIGURE 1.

FIGURE 3 depicts the interconnection of NOR circuits for providing four output devices within the sequential output network 10 of FIGURE 1. Each of the four output devices is shown as a latch which produces a corresponding one of the outputs O1 through O4. Each latch consists of a NOR circuit 31 and a NOR circuit 32. These NOR circuits are cross-coupled in the same manner as NOR circuits 19 and 20 described in FIGURE 2. NOR circuit 32 has a plurality of inputs, each input providing a set signal to the output device from a corresponding memory cell from the matrix 11 shown in FIGURE 1. The inputs to NOR 32 are represented in FIGURE 1 as the set lines 12. NOR circuit 32 produces an up level at its output in response to the plurality of inputs all having a down level. This is the input condition to NOR 32 when the latch combination of NOR circuits 31 and 32 is in a reset condition. The latch combination will be set to produce a down level at the output of NOR 32 whenever any one of the plurality of inputs is placed at an up level. When the latch combination has been set to produce a down level at the output of NOR 32, the latch combination will be reset whenever NOR circuit 31 receives an up level input. One reset input to NOR circuit 31 comes from a NOR circuit 33 which receives as inputs the reset lines 12 in FIGURE 1. The nomenclature utilized for the set and reset inputs shown in FIGURE 3 will be described in connection with the discussion of FIGURE 4 to follow. One other input shown in FIGURE 3 is the reset line 14 shown in FIGURE 1. The reset line 14 which is applied to all of the latch combinations of FIGURE 3 is effective to reset the output network. The reset condition for the sequential output network is such that the output O1 will be produced and this will represent the starting output condition for any sequence to be produced. It will be the function of the adaptive memory cell matrix 11 of FIGURE 1 to provide the necessary sequence of set and reset signals to the latch combinations in FIGURE 3 to produce the desired sequence of outputs, O1, O2, O3, or O4.

The set and reset lines to the latch combinations O1 through O4, shown in FIGURE 3, are generated from an adaptive memory cell matrix to be described in connection with FIGURE 4. Each of the memory cells (MC) is identical to the one described in FIGURE 2. The input signals to the adaptive memory cell matrix include a down level on 1 out of the 4 possible output signals O1 through O4, an up level on 1 out of the 2 possible primary input signals I1 or I2, and 1 out of 4 up levels on the adaptive inputs A1 through A4.

Recalling the discussion of FIGURE 2, each of the memory cells includes a gating NOR circuit 17 which will produce an up-level output when it receives, at its inputs, an enabling signal from NOR circuit 18, a particular one of the primary inputs, and a particular one of the outputs of the sequential output network. The enabling signal produced by NOR circuit 18 will be maintained continuously once NOR circuit 17 has produced an output as indicated by the memory latch portion of the memory cell. In FIGURE 4 it can thus be seen that there are eight groups of gating NOR circuits 17 producing set signals to the output devices. The eight groups of gating circuits and associated latch or enabling signal maintaining means, correspond to the 4 possible output signals and 2 possible input signals. Further, each of the eight groups of memory cells consist of four memory cells. The four memory cells in each group all have inputs from the same output from the sequential output network and the same primary input. The four memory cells within each group correspond to the four latch combinations shown in FIGURE 3. Therefore, it should be evident from the preceding description, that any desired number of output devices S can be provided to be responsive to any desired number of primary inputs N by producing a matrix of adaptive memory cells consisting of $N \times S$ groups of gating means, each of the groups of gating means consisting of S memory cells.

The outputs of the memory cells have been labeled to designate the output device in FIGURE 3 which is to receive a set signal in response to particular input conditions. For example, the designation S311 indicates that the memory cell is to produce a Set signal to output device O3 when the present output being produced is O1 in response to a primary input signal I1. Further, the memory cell with the output designation S222 can be adapted to produce a setsignal to output device O2 when the present output signal is O2 in response to a primary input signal I2.

As mentioned previously, for each change of the primary input signals, a particular output device of FIGURE 3 is to be reset at the same time that the desired output signal is produced in response to the primary input signal. As a part of the mass-produced adaptive memory cell matrix, a series of memory cells are provided for producing output signals to the reset inputs of the latch combinations of FIGURE 3. These memory cells are shown with outputs designated R11, R12, etc., indicating, for example, a Reset to output device O1 in response to the primary input I1.

For example, if output device O3 is adapted by signal A3 to be set by the primary input I1, the memory cell labeled R31 will also be set during the initial adapting phase. Thereafter, when primary input I1 sets output device O3, the memory cell labeled R31 will produce an up level to the NOR circuit 3 (FIGURE 3) associated with output device O3. The memory cell of FIGURE 4 labeled R32 will be at a down level. Thereafter, after latch combination O3 has been set, and the primary input I1 disappears, both inputs to the NOR 33 associated with output device O3 will go to a down level producing an up level to NOR 31 resetting the latch output.

The previous description has assumed that the primary inputs I1 and I2 are signals which maintain the input level throughout the duration of the desired output. An input signal which, through the operation of one of the associated memory cells causes a particular output latch combination of FIGURE 3 to be set, also performs the reset of that latch combination when the primary input signal is dropped and another primary input signal raised. A modification to the output latch combinations is shown in FIGURE 5 which permits the setting of an output latch through the use of the memory cell matrix of FIGURE 4 but eliminates the reset signals utilized in the matrix of FIGURE 4. Rather, a reset signal to a particular output latch combination is generated in response to any other output latch being set. With this modification, the primary input signals I1 or I2 need not be maintained at a particular level throughout the duration of the desired output. Rather, once a primary input has been utilized through a particular memory cell of FIGURE 4 to set an output device in FIGURE 5, the reset of the previously set output device can be made independent of the primary input such that the primary input can be removed.

This then permits a pulse type operation of the primary inputs as opposed to levels.

The modification of the latch combinations shown in FIGURE 5 includes the previously mentioned NOR circuits 31 and 32 which function as cross-coupled circuits to perform the latching operation. The setting of a particular latch combination is still performed in the manner shown in connection with FIGURE 3 wherein a particular memory cell of the matrix in FIGURE 4 produces an up level to the NOR circuit 32 to thereby lower the output of NOR 32 which in combination with NOR 31 accomplishes the latching function. The resetting of a previously set latch combination is performed by NOR circuits 34 and 35 for each of the latch combinations. The output of each of the NOR circuits 31, is fed to each of the other NOR circuits 34. Further, the output of each of the NOR circuits 32 for a particular latch is fed back through a delay 36 to the other input of the NOR circuits 35.

Assuming that the output latch combination O1 is set, NOR circuit 34 will have all three inputs at a down level. This produces an up level to NOR circuit 35 which, when combined with a down level of NOR 32 produces from NOR 35 a down level to NOR 31 maintaining the latched output. If it is now assumed, that output latch combination O2 receives a set input to NOR 32, the output of NOR 32 will go to a down level which when combined at NOR 31 will produce an up level to thereafter maintain the latched output. As soon as the output of NOR 32 for output device O2 goes to a down level, the output of NOR 31 of O2 will go to an up level which when applied to the NOR 32 of output device O1 produces a down level to the input of NOR 35 which when combined with the down level from NOR 32 produces an up level to input of NOR 31 resetting the latched output for device O1. Until the output of NOR 31 for output device O1 goes to a down level, NOR 34 for output device O2 will be producing a down level to NOR 35. If this were combined with a down level from NOR 32 of O2 which has been set, NOR 35 would provide an up level to NOR 31 resetting the latch. The delay device 36 applied at the input of each of the NOR circuits 35 must be of a duration suitable to maintain the up level from NOR 32 at NOR 35 until such time as the NOR circuit 34 can produce an up level to the other input of NOR 35. In the absence of the delay device 36, the output device to be set would receive a reset signal at the input of NOR 31 since circuit delays would not permit fast enough change of the input to NOR 34 of the output device being set from the NOR circuit 31 of the output device being reset.

Figure 4:
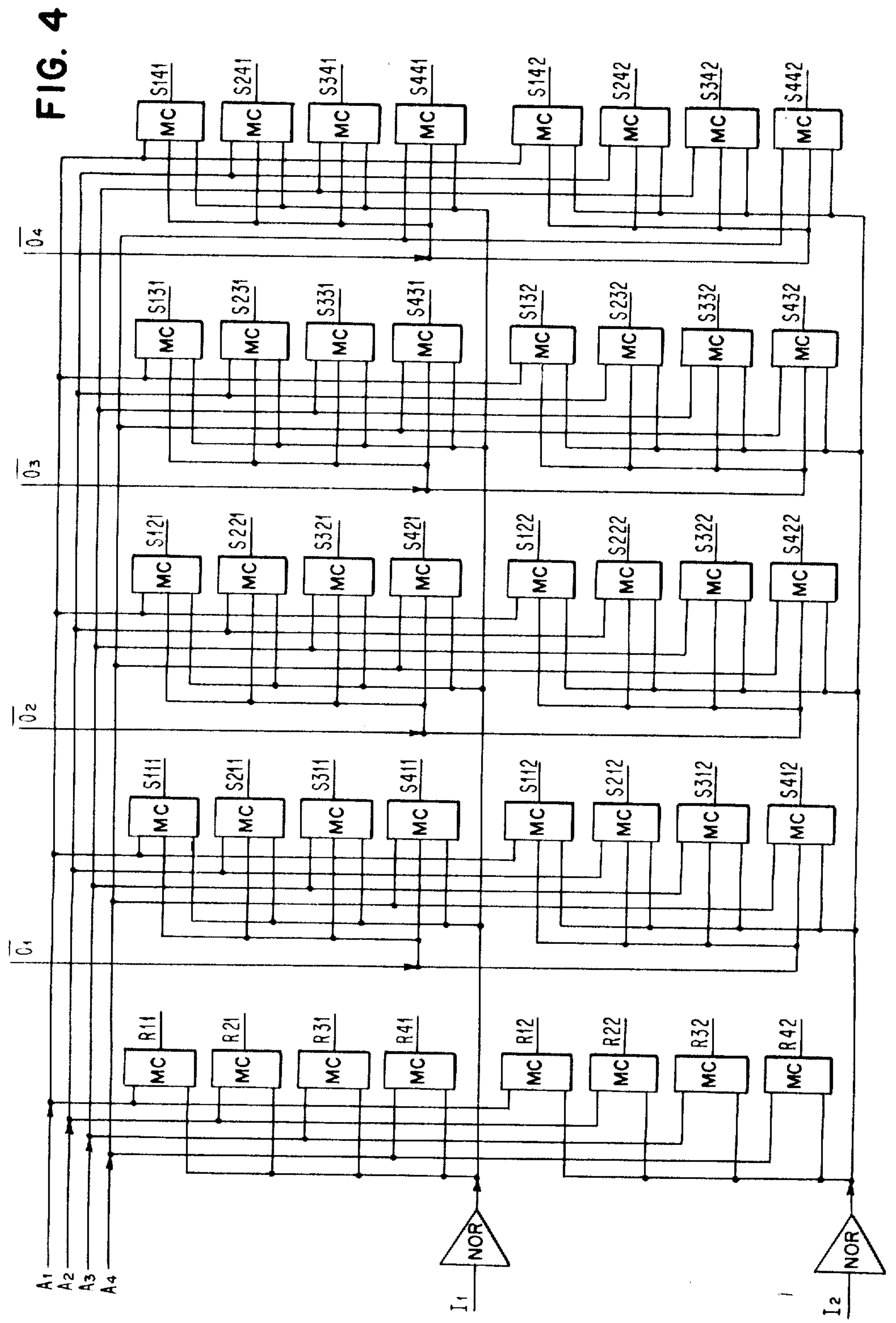
FIGURE 4 is a schematic representation of the adaptive memory cell matrix shown in FIGURE 1, each of the memory cells containing the circuit shown in FIGURE 2.
Figure 5:
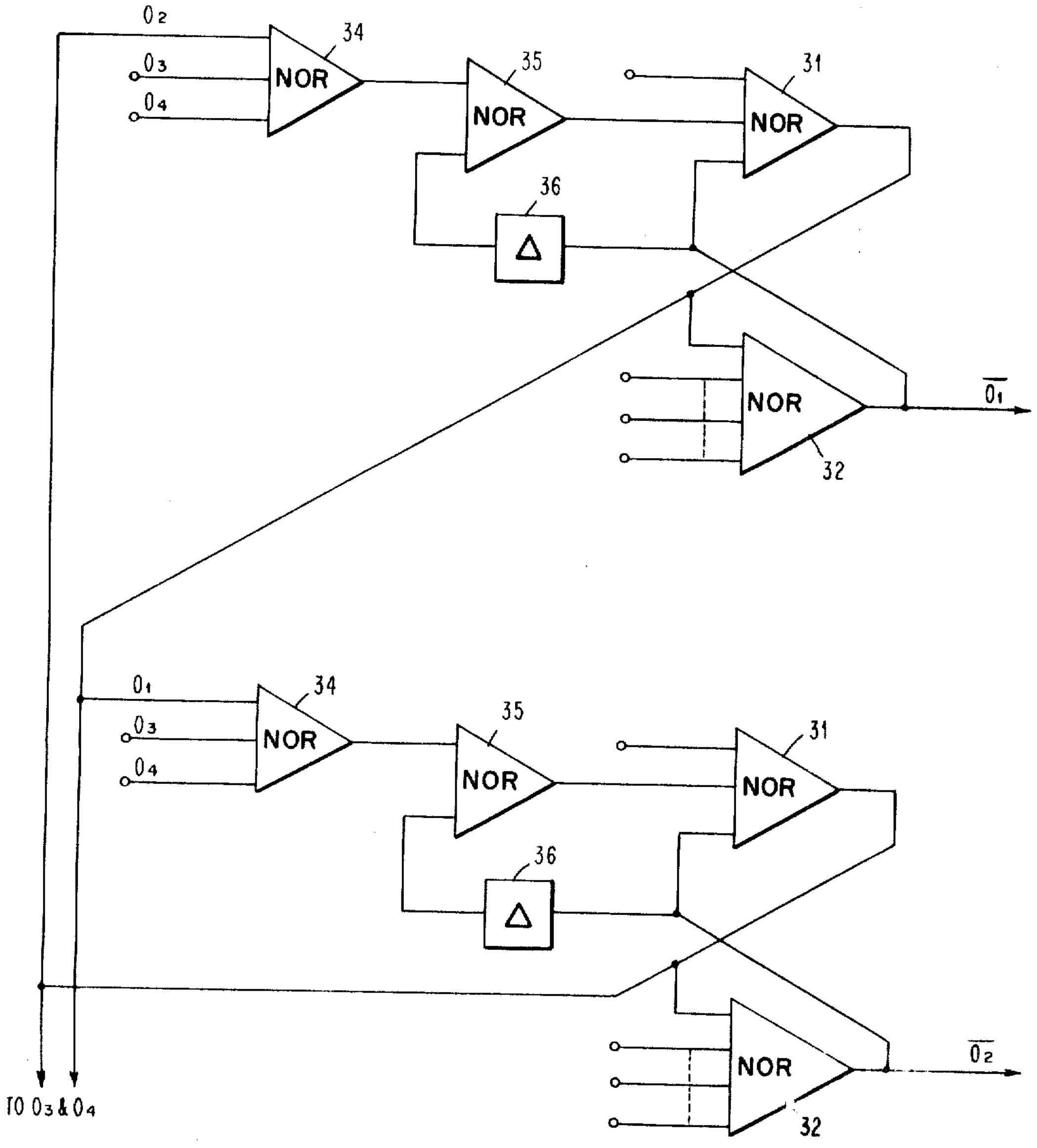
FIGURE 5 is a circuit diagram of a portion of an output network which is a modification of the network shown in FIGURE 3 permitting operation with pulse type inputs.

If it is assumed that a positive reset signal has been applied to line 13 shown in FIGURES 1 and 2, any memory cell such as shown in FIGURE 2 within the matrix of FIGURE 4 will have been reset. Thereafter, when it is desired to adapt the memory cell matrix to perform a particular function, the simultaneous application of a positive primary input I1 or I2 with a positive adaptive input A1, A2, A3, or A4 will set a particular one of the memory cells in the group of memory cells associated with the output device O1, O2, O3 or O4 which is presently in the set condition. The output of the memory cell will set the output device designated by the adaptive input. As the stable condition of the 1-out-of-4 output devices changes, another output device can be set in response to the new stable state of the output network in combination with the next primary input and the adaptive input designating the next desired state of the output devices. Thereafter, the memory cells will repeat the sequence of set signals to the output devices without the need for the adaptive inputs.

The uses to which the circuit of the invention as depicted in FIGURE 1 can be put is almost limitless. In response to alternate application of up levels on the primary inputs I1 and I2, which are shown applied to inverting NOR circuits in FIGURE 4, the output of the sequential output network can be caused to advance from one state to any other desired state in a repeatable sequence as dictated by the initial setting of the memory cells in response to the adaptive inputs during the initial adapting phase of the operation. Several functions of the inventive circuit which are readily apparent include use of the sequential output network as either a distributor or multiplexor, frequency divider, or ring counter. In response to a series of up level pulses on only one of the primary inputs, the sequential output network can be made to advance from one stable state to another in a repeating sequence. In use as a divider, any desired multiple can be selected by utilizing only a particular one of the outputs of the output network and causing the sequential output network to, for example, advance from O1, to O2, to O3, and back to O1. This would provide a division by 3. Any other sub-multiple of a number of inputs could be selected dependent upon the number of sequential outputs produced before the output sequence is repeated.

As a multiplexor, pulse distributor, or ring counter, a single one of the primary inputs could be utilized and any desired sequence of outputs produced in any desired number.

By providing a serial sequence of inputs alternately on both of the primary inputs I1 and I2, the sequential output network can be utilized to recognize a particular sequence of inputs. A simple example would be to cause the sequential output network to produce a continuous output O1 during a sequence of pulses on primary input I1. In response to a pulse on primary input I2, the output could be caused to advance to O2. The circuit could be adapted to recognize three consecutive input pulses on primary input I2. Three consecutive inputs on primary input I2 could be recognized when an output is produced on output O4. At any time after receipt of the first pulse on primary input I2, and another input is produced on primary input I1 prior to receipt of three consecutive signals on input I2, the output conditions could be caused to reset back to the beginning state O1.

Another desirable use of the inventive circuit would be as a command generator in a data processing system wherein the outputs of the sequential output network can be utilized as gating signals to be utilized with further timing signals for the sequential gating of data within a data processing system in response to various commands. The advance from one command generation as represented by one of the sequential output network outputs can be made dependent on machine conditions as represented by primary inputs.

Although all the previous discussion has been confined to indicating how the sequential output network can produce one out of a plurality of possible outputs in a desired sequence, it should be readily apparent to those skilled in the art that the adaptive memory cell matrix can further be utilized to cause the sequential output network to produce a plurality of simultaneous outputs in response to a particular primary input. During the first or adaptive phase of the operation, there is no restriction upon producing an up level on more than one of the adaptive inputs A1 through A4. In this case, in response to a particular stable state of the sequential output network fed back to the adaptive memory cell matrix, a plurality of adaptive inputs in combination with a particular one of the primary inputs can be utilized to set a plurality of the memory cells within a particular one of the memory cell groups. This will cause more than one output device to be set. As was mentioned earlier, it is possible to expand the adaptive memory cell matrix as depicted in FIGURE 4 to provide any number of primary inputs and any number of outputs of the sequential output network. Utilization of the matrix to produce simultaneous outputs from the output network suggests a use of the invention as a translator. In this case, a prior decoding network could produce, in response to a number of permutations of input signals, one out of a plurality of primary inputs to the adaptive network. In response to this one primary input, the memory cell matrix can be adapted to produce any desired combination of outputs from the output network.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device of the class described comprising:
a plurality of output devices, each producing an output signal in response to a set input;
input signalling means;
a plurality of normally ineffective set signalling means each connected and responsive to the output of one of said output devices and said input signalling means for producing a set input to a particular one of said output devices;
and means connected to each of said set signalling means, operative to selectively render said set signalling means effective to produce a selectable and repeatable sequence of set signals to said particular output device in response to a repeatable sequence of said input signalling means.

2. A device in accordance with claim 1 wherein said last named means for each of said set signalling means includes:
memory means, responsive to an output from said set signalling means, for thereafter invariably maintaining said set signalling means effective to produce said set signal to said particular output device in response to an input from said one output device and said input signalling means.

3. A device in accordance with claim 2 including:
reset signalling means;
and means connecting said reset signalling means to all of said memory means to negate the effect of said memory means to thereby render all of said set signalling means ineffective.

4. A device of the class described comprising:
means producing a sequence of input signals;
means producing a plurality of output signals;
means operative only during a first cycle of said input sequence for specifying a desired one of said plurality of outputs for each one of said inputs of the sequence;
and a plurality of memory means each responsive and connected to a predetermined one of said output producing means, said input producing means, and a predetermined one of said output specifying means for storing and producing an output indicative of having simultaneously received said three inputs, said memory means output being operative to produce said specified output from said output producing means.

5. A device in accordance with claim 4 wherein each of said memory means includes:
means, operative after said first cycle of said input sequence, responsive to said predetermined output means and said input sequence, for producing an output from said output means as indicated by said specifying means during said first input sequence.

6. A device in accordance with claim 4 wherein each of said memory means includes:
gating means normally unresponsive to one of said output means, and said input signalling means;

enabling means connected to said output specifying means for producing an enabling signal to said gating means for producing said memory means output;
and means, responsive to the output of said gating means, connected to said enabling means, for maintaining the enabling input to said gating means.

7. A device in accordance with claim 6 wherein said enabling signal maintaining means includes:
a latch circuit having set and reset inputs, and an output connected to the input of said enabling means, said set input being responsive to the memory means output from said gating means;
and reset signalling means connected to the reset input of said latch, operative to reset said latch and thereby render said gating means unresponsive to said input signal and said output signal.

8. A device of the class described comprising:
S output devices having set and reset inputs;
N input signalling means;
N×S groups of normally disabled gating means, all of the gating means in each of said groups being connected to a combination of one of said N inputs and one of said S outputs unique to said group, the output of corresponding ones of said gating means in each of said groups being connected to the set input of a predetermined one of said output devices;
means connected to each one of a corresponding one of said gating means in each of said groups, for producing an enabling signal to said related gating means to thereby produce an output to the set input of said predetermined output device from said gating means in said group of gating means receiving the proper combination of one of said N inputs and one of said S outputs;
and means responsive and connected to the output of an associated one of said gating means and producing an output to said related enabling means for maintaining the presence of said enabling signal.

9. A device of the class described comprising:
an output network comprised of a plurality of energizable signalling means;
a plurality of gating means connected and responsive to the output of each of said output signalling means, each of said gating means providing an energizing input to a particular one of said output signalling means;
means enabling a selected one of said plurality of gating means;
input signalling means connected to the input of all of said gating means operative to produce an energizing input to said particular output signalling means associated with said enabled gating means;
and means responsive to an output of each of said gating means to maintain said enabling signal.

References Cited

UNITED STATES PATENTS

| | | | |
|---|---|---|---|
| 3,093,819 | 6/1963 | Lynch | 340—347 |
| 3,209,328 | 9/1965 | Bonner | 340—146.3 |
| 3,252,004 | 5/1966 | Scherr | 307—88.5 |
| 3,267,439 | 8/1966 | Bonner | 340—146.3 |
| 3,284,780 | 11/1966 | Clapper | 340—172.5 |
| 3,317,900 | 5/1967 | Clapper | 340—172.5 |
| 3,317,901 | 5/1967 | Clapper | 340—172.5 |

ROBERT C. BAILEY, *Primary Examiner.*

PAUL J. HENO, *Examiner.*